US007548860B2

(12) United States Patent
Li

(10) Patent No.: US 7,548,860 B2
(45) Date of Patent: Jun. 16, 2009

(54) METHOD AND APPARATUS FOR INPUTTING CHINESE CHARACTERS

(75) Inventor: Wen-Piao Li, Taipei (TW)

(73) Assignee: Inventec Appliances Corp., Taipei (TW)

( * ) Notice: Subject to any disclaimer, the term of this patent is extended or adjusted under 35 U.S.C. 154(b) by 0 days.

(21) Appl. No.: 11/218,541

(22) Filed: Sep. 6, 2005

(65) Prior Publication Data

US 2007/0055521 A1 Mar. 8, 2007

(51) Int. Cl.
*G10L 13/00* (2006.01)

(52) U.S. Cl. ............................ 704/270; 704/8; 345/171

(58) Field of Classification Search ................. 704/270, 704/8; 345/171

See application file for complete search history.

(56) References Cited

U.S. PATENT DOCUMENTS 6,809,725 B1 * 10/2004 Zhang ........................ 345/171

* cited by examiner

*Primary Examiner*—Susan McFadden
(74) *Attorney, Agent, or Firm*—Muncy, Geissler, Olds & Lowe, PLLC

(57) ABSTRACT

An electronic apparatus, to which Chinese characters can be input by using a phonetic input method. The electric apparatus comprises a plurality of input keys and a switch circuit. The plurality of input keys are divided into three groups: initial consonant keys, compound vowel keys, and medial vowel keys. The switch circuit is used for switching the function of some of the initial consonant keys into that of tone keys after a user presses any key for a first phonetic symbol of a phonetic symbol combination.

8 Claims, 3 Drawing Sheets

40

METHOD AND APPARATUS FOR INPUTTING CHINESE CHARACTERS

BACKGROUND OF THE INVENTION (1) Field of the Invention

The present invention relates to an electronic device, especially an electronic device to which Chinese characters can be input.

(2) Description of the Prior Art

The mobile phone is almost the most popular hand-held electronic device presently. People can communicate or talk with others by using the mobile phone, and they can also deliver electronic messages at any time to inform others. Since message delivering by using the mobile phone is quick and cost saving, it becomes popular with most mobile phone users.

To satisfy different kinds of mobile phone users, there're various kinds of Chinese input methods. Chinese input in the electronic device is quite different from English input, for the Chinese has 37 phonetic symbols and five tones in character notations. To allot these 37 phonetic symbols and 5 tones into the keyboard or keypad of the device is definitely not easy.

FIG. 1 shows a prior art 10 for inputting the phonetic symbols. As shown in FIG. 1, 37 phonetic symbols are allotted evenly into numeral keys. A user can select any phonetic symbol by pressing the respective key. For example, we can select the phonetic symbol –ㄔ" by pressing the #5 key twice.

FIG. 2A~FIG. 2C show the same prior art screen in processing the input of phonetic symbols. To input the Chinese character "祝" (or phonetically symbolized as ㄓㄨ\) for example, the numeral key "5" shown in FIG. 1 is pressed once to have part of the display screen 20 show the first phonetic symbol "ㄓ", and at the same time the bottom of the screen 20 shows all the characters that include the phonetic symbol "ㄓ". Then, press the numeral key "0" of FIG. 1 twice to have the phonetic symbol combination of "ㄓㄨ" shown on the screen 21, and at the same time the bottom of the screen changes again to show all possible characters having the phonetic symbols "ㄓㄨ" (as shown in FIG. 2B). By moving the cursor along the character list, the user of the mobile phone can finally find the desired character "祝" and add the character into the message (as shown in FIG. 2C). Thereafter, a new search on a particular character can be started. However, there're always a lot of characters in a Chinese message, and finding characters one by one by phonetic symbol combinations and cursor moving is definitely time-consuming and inconvenient.

To improve the above situation, there is another phonetic input method which has a particular association function. FIG. 3 shows how the association function works. While the character "我" is inputted, the bottom of the screen shows some characters which can follow the character "我" to form a meaningful connection, and then the user can choose the next character quickly if the next character is already shown.

The phonetic symbol input described above is not the only way to input the Chinese characters. Inputting characters by stroke ordering or by English phonetic symbols are also well-known. However, since people in Taiwan or in Chinese world are familiar to learn Chinese by phonetic symbols, the aforesaid character input by phonetic symbol grouping is still the mainstream.

Therefore, to ease the difficulty in inputting Chinese characters is necessary and important.

SUMMARY OF THE INVENTION

The object of the present invention is to provide a method and an apparatus for inputting Chinese characters.

Another object of the present invention is to provide a phonetic input method used in an hand-held electronic device.

Accordingly, an electronic device, to which Chinese characters can be input by using a phonetic input method, comprises a plurality of input keys and a switch circuit. The input keys are divided into three groups: initial consonant keys, compound vowel keys, and medial vowel keys. The switch circuit is used for switching the function of some of the initial consonant keys into that of tone keys after a user presses any key for inputting a first phonetic symbol of a phonetic symbol combination.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The present invention provides a method for inputting Chinese characters generally used for an hand-held electronic device such as a mobile phone. The method enables users to input phonetic symbols and tones in order. The mobile phone in accordance with the present invention comprises a plurality of input keys and a switch circuit. The input keys are divided into three groups: initial consonant keys, compound vowel keys, and medial vowel keys. The switch circuit is used for switching the function of some of the initial consonant keys into that of tone keys after an user presses any key for a first phonetic symbol of a phonetic symbol combination.

According to the phonetic input method of the present invention, the 37 phonetic symbols are divided into 12 groups for matching the 12 keys labeled respectively as 0~9, *, and #. The 12 keys are composed of 6 initial consonant keys, 3 compound vowel keys, and 3 medial vowel keys.

Figure 1:
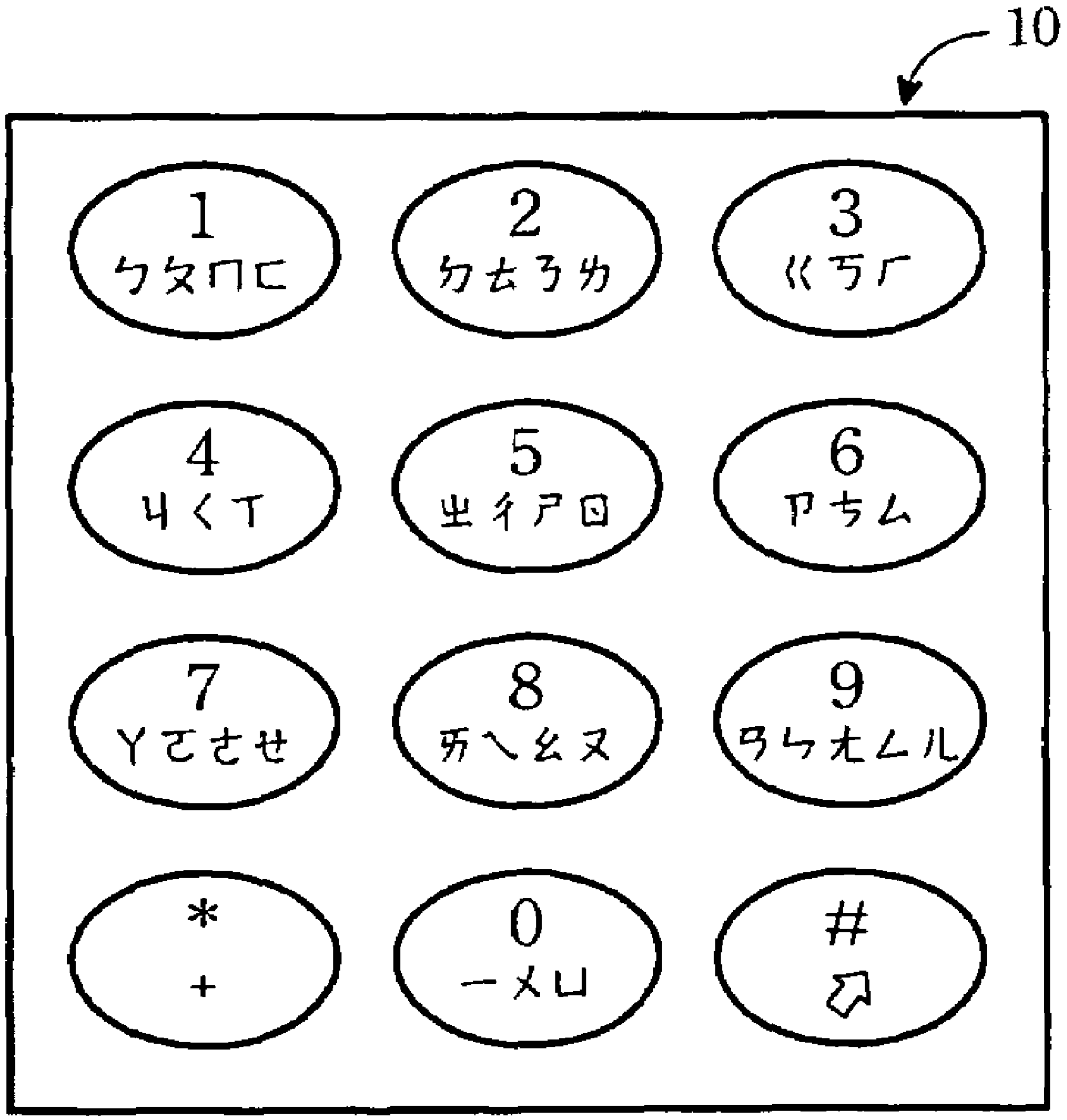
FIG. 1 shows a prior art of processing a phonetic symbol input.
Figure 2A:
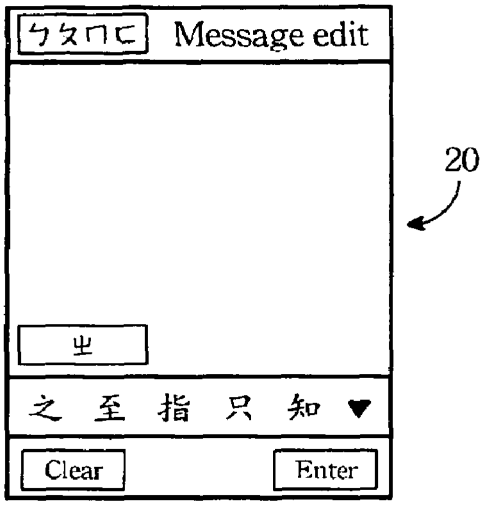
FIG. 2A~FIG. 2C show a common prior art of processing a phonetic symbol input.
Figure 2B:
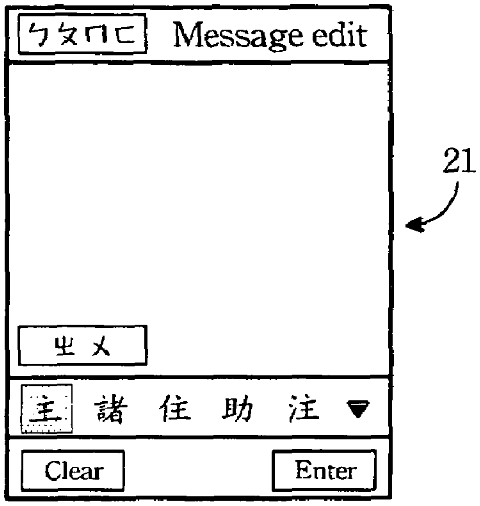
Figure 2C:
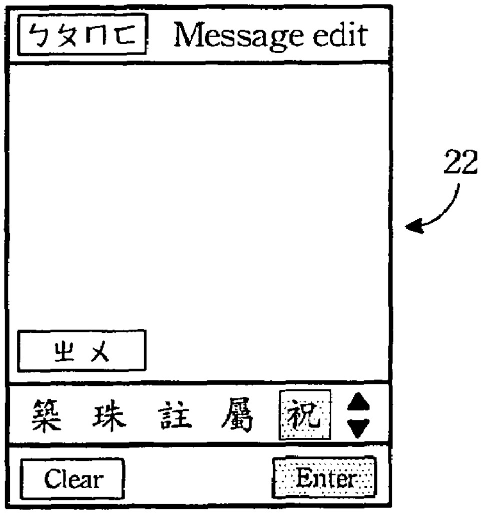
Figure 3:
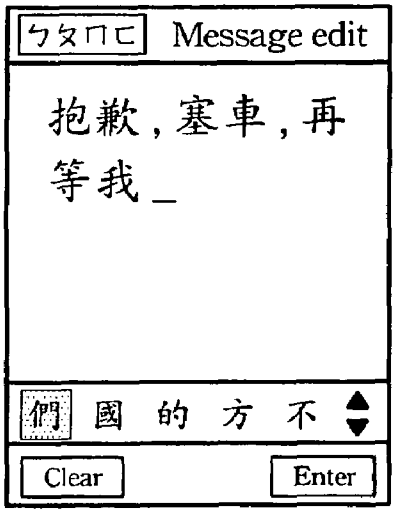
FIG. 3 shows how the association function works in a prior art.
Figure 4A:
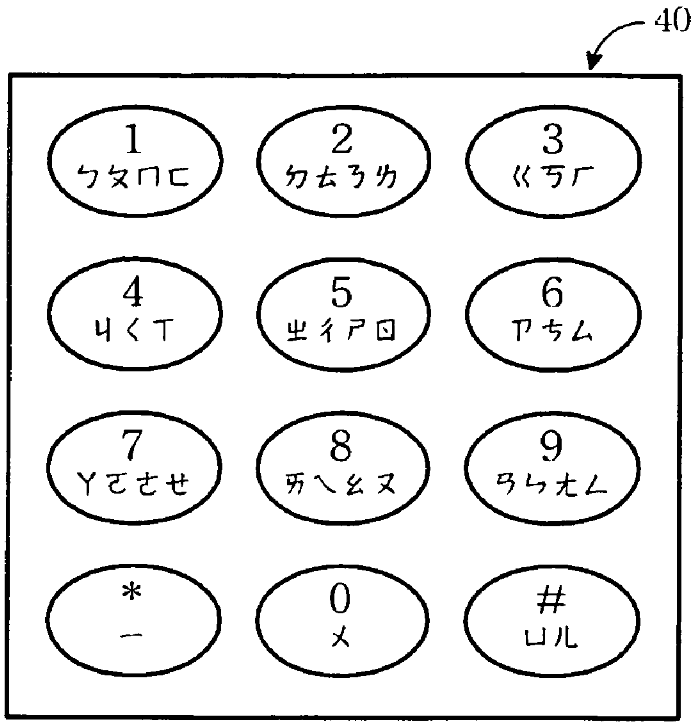
FIG. 4A shows the diagram of a preferred key pattern in accordance with the present invention.

FIG. 4A shows the diagram of the preferred key pattern 40 of the present invention. The phonetic symbols of the 6 initial consonant keys are respectively the six groups as follows: (ㄅㄆㄇㄈ), (ㄉㄊㄋㄌ), (ㄍㄎㄏ), (ㄐㄑㄒ), (ㄓㄔㄕㄖ), and (ㄗㄘㄙ). The numeral keys used as the initial consonant keys are labeled as 1~6 respectively, in which the numeral keys labeled as 1~5 respectively can also be switched to function as the tone keys and represent Ying Ping tone [ ], Yang Ping tone [ˊ], Shang Sheng tone [ˇ], Qu Sheng tone [ˋ], and an unstressed tone [˙], respectively. The phonetic symbols of the compound vowel keys are respectively the three groups as follows: (ㄚ), ㄛㄜㄝ), and (ㄞㄟㄠㄡ), and (ㄢㄣㄤㄥ), the numeral keys used as the compound vowel keys are labeled as 7~9, respectively. The phonetic symbols of the medial vowel keys are respectively as follows: (ㄧ), (ㄨ), and (ㄩㄦ), and the keys used as the medial vowel keys are labeled as 0, *, and #, respectively.

In the present invention, each Chinese character can be formed by utilizing the basic characteristics of the initial consonants, the compound vowels, the medial vowels, and the tones. Basically, the composition of one Chinese phonetic notation is one of the groups of (an initial consonant+a compound vowel+a tone), (an initial consonant+a compound vowel+a medial vowel+a tone), (a compound vowel+a medial vowel+a tone), (a compound vowel+a tone), and (an initial consonant+a tone). It is noted that every Chinese character includes at least one phonetic symbol and one tone. If the initial consonant exists, it can only occur once and must be the first key to be inputted. Hence, the switch circuit will switch the function of some of the initial consonant keys (labeled as 1~5 respectively herein) into that of the tone keys after an user presses any key for a first phonetic symbol of a notional phonetic symbol combination (symbolized as a particular Chinese character), and thereby the user can press the particular tone key to finish the Chinese character phonetic input.

For example, to input a Chinese character "不" (symbolized as ㄅㄨˋ). Firstly, press the #1 key to locate the group (ㄅㄆㄇㄈ). Almost at the same time, the switch circuit will switch the function of the #1~#5 keys into that of tone keys. Then, press the #0 key to input the phonetic symbol "ㄨ". Finally, press #4 key to input the tone and complete the input procedures of the Chinese phonetic transcription "ㄅㄨˋ". However, the monitor of the mobile phone can only show phonetic transcriptions of ㄅㄨˋ,ㄆㄨˋ,ㄇㄨˋ,and ㄈㄨˋafter striking the #1 key, the #0 key and then the #4 key. The user then can choose the right transcription via controlling the master button or via the respective key (for instance, in ranking order, ㄆㄨˋis through #2). After selecting the right transcription (for example, by striking #1 key to locate the "ㄅㄨˋ), the monitor of the mobile can show all Chinese characters pronounced as "ㄅㄨˋ" for the user to choose the right one.

Figure 4B:
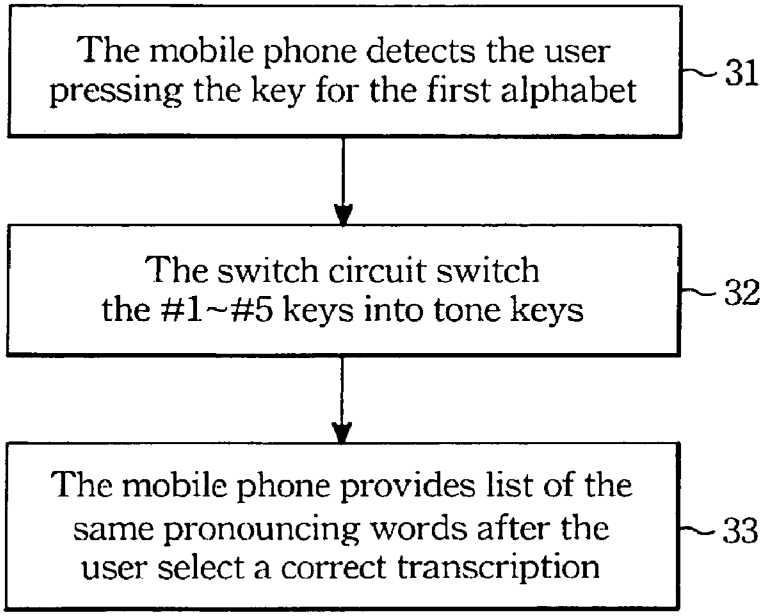
FIG. 4B shows responding steps of the mobile phone in accordance with the present invention, while the user is pressing keys to input phonetic symbols.

FIG. 4B shows responding steps of the mobile phone while the user is pressing keys to input phonetic symbols. In Step 31, while the mobile phone detects that the user has already pressed the key for the first phonetic symbol, the switch circuit will immediately switch the function of the #1~#5 keys into that of tone keys (Step 32), and the mobile phone provides a list of characters with the same pronunciation after the user selects a correct transcription (Step 33).

The input method of the present invention provides users a more convenient approach to inputting Chinese characters. Both the time and the operation steps are greatly saved comparing to the prior art.

In addition, the strokes of a simplified Chinese character (used in mainland China) and a complex Chinese character (used in Taiwan) are different, but the phonetic notations are the same. Therefore, with different software, the Chinese input method disclosed herein may be easily applied at both simplified and complex modes. This is also an advantage of this phonetic transcription input that other input methods can't afford.

While the present invention has been particularly shown and described with reference to a preferred embodiment, it will be understood by those skilled in the art that various changes in form and detail may be without departing from the spirit and scope of the present invention.

I claim:

1. An electronic apparatus for inputting Chinese characters by utilizing a phonetic input method, comprising:

a plurality of input keys divided into three groups: initial consonant keys, compound vowel keys, and medial vowel keys; and a switch circuit used for switching the function of some of the initial consonant keys into that of tone keys after an user presses one of the plurality of input keys to determine a first phonetic symbol of a phonetic symbol combination.

2. An electronic apparatus according claim 1, wherein the electronic apparatus comprises 6 of the initial consonant keys, 3 of the compound vowel keys, and 3 of the medial vowel keys.

3. A Chinese input method used for a hand-held electronic device, wherein the hand-held electronic device comprises a plurality of input keys used for inputting phonetic symbols, the input keys are divided into three groups: initial consonant and tone keys, compound vowel keys, and medial vowel keys, and the Chinese input method comprises:

pressing one of the plurality of input keys to input a first phonetic symbol of a Chinese character;

switching the function of some of the initial consonant and tone keys to function as tone keys; and pressing one of the tone keys to input a tone for the Chinese character.

4. The Chinese input method according to claim 3, wherein there are 6 of the initial consonant and tone keys, and the phonetic symbols represented by the 6 initial consonant and tone keys are respectively the groups of (ㄅ(ㄆㄇㄈ), (ㄉㄊㄋㄌ), (ㄍㄎㄏ), (ㄐㄑㄒ), (ㄓㄔㄕㄖ) and (ㄗㄘㄙ).

5. The Chinese input method according to claim 4, wherein the input keys used for the initial consonant keys are labeled as 1, 2 3, 4, 5, and 6 respectively, in which the initial consonant keys labeled as 1~5 are switchable to function as the tone keys and represent Ying Ping tone, Yang Ping tone, Shang Sheng tone, Qu sheng tone, and an unstressed tone, respectively.

6. The Chinese input method according to claim 3, wherein there are 3 of the compound vowel keys, and the phonetic symbols of the compound vowel keys are respectively the groups of (ㄚㄛㄜㄝ), (ㄞㄟㄠㄡ), and (ㄢㄣㄤㄥ).

7. The Chinese input method according to claim 3, wherein there are 3 of the medial vowel keys, and the phonetic symbols of the medial vowel keys are respectively (ㄧ), (ㄨ), and (ㄩㄦ).

8. A mobile phone supporting a Chinese input method for sequentially inputting phonetic symbols and a tone of a Chinese character, the mobile phone comprising 12 input keys labeled as 1~9, 0, #, and *, respectively, for inputting phonetic symbols and tones, comprising:

six initial consonant keys, phonetic symbols of the initial consonant keys being respectively the groups of (ㄅㄆㄇㄈ), (ㄉㄊㄋㄌ), (ㄍㄎㄏ), (ㄐㄑㄒ), (ㄓㄔㄕㄖ), and (ㄗㄘㄙ), wherein numeral keys used for the respective initial consonant keys are labeled as 1~6, wherein the keys labeled as 1~5 are switchable to function as tone keys and represent Ying Ping tone, Yang Ping tone, Shang Sheng tone, Qu sheng tone, and an unstressed tone respectively;

three compound vowel keys, phonetic symbols of the compound vowel keys being respectively the groups of (ㄚㄛㄜㄝ), (ㄞㄟㄠㄡ), and (ㄢㄣㄤㄥ); and three medial vowel keys, phonetic symbols of the medial vowel keys being respectively (ㄧ), (ㄨ), and (ㄩㄦ);

wherein, after an user presses one of the input keys to determine a first phonetic symbol of a phonetic symbol combination, the switch circuit switches the function of some of the initial consonant keys into that of the tone keys, and thereby the user is permitted to input the proper tone key to finish the Chinese character input.

* * * * *